United States Patent [19]

Lane

[11] 4,413,907

[45] Nov. 8, 1983

[54] REMOTE CONTROL SURVEYING

[75] Inventor: Vern E. Lane, Cheyenne, Wyo.

[73] Assignee: Robert F. Deike, Cheyenne, Wyo.

[21] Appl. No.: 204,813

[22] Filed: Nov. 7, 1980

[51] Int. Cl.³ .................. G01B 11/26; G01C 3/08
[52] U.S. Cl. ............................ 356/141; 33/1 CC;
318/16; 350/100; 350/289; 356/5
[58] Field of Search ............ 350/100, 289; 33/1 CC;
356/1, 4, 5, 141, 152; 318/16

[56] References Cited

U.S. PATENT DOCUMENTS

| | | | |
|---|---|---|---|
| 3,348,108 | 10/1967 | D'Onofrio | 318/16 |
| 3,574,466 | 4/1971 | Peters | 356/152 |
| 3,680,958 | 8/1972 | Von Bose | 356/141 |
| 3,736,058 | 5/1973 | Iadarola | 356/4 |
| 3,790,277 | 2/1974 | Hogan | 356/152 |
| 3,865,491 | 2/1975 | Hogan | 356/152 |
| 3,914,029 | 10/1975 | Hoplock | 350/289 |
| 4,025,193 | 5/1977 | Pond et al. | 356/5 |
| 4,035,084 | 7/1977 | Ramsay | 356/152 |
| 4,075,660 | 2/1978 | Horowitz | 358/122 |

FOREIGN PATENT DOCUMENTS 580274  8/1976  Switzerland.

*Primary Examiner*—S. C. Buczinski

*Attorney, Agent, or Firm*—Hill, Van Santen, Steadman & Simpson

[57] ABSTRACT

A method and apparatus for remote control surveying which eliminates the need for a rod man or other assistant while performing surveying operations with an electronic distance measuring device. The method includes positioning reflectors over the end points of a base line of known length, positioning an electronic distance measuring device over a desired survey station, rotating the reflectors into alignment with the electronic measuring device by remote control, and measuring the distance from the survey station to the two reflectors. The method also includes traverse operations using a single reflector positioned over a base point. The location of the survey station can then be calculated and the electronic distance measuring device may be relocated to subsequent survey stations and the reflectors realigned by remote control. The apparatus includes an attachment for a standard surveyor's tribrach which rotatably supports a standard reflector unit and an electric motor in a vertical position. An operator selectively activates switches on a portable radio transmitter. The signal is received by a control box which energizes the motor to rotate the reflector unit in the desired direction. A stroboscopic light may be attached to the top of the reflector unit to rotate in conjunction with the reflector unit and aid in its alignment.

9 Claims, 13 Drawing Figures

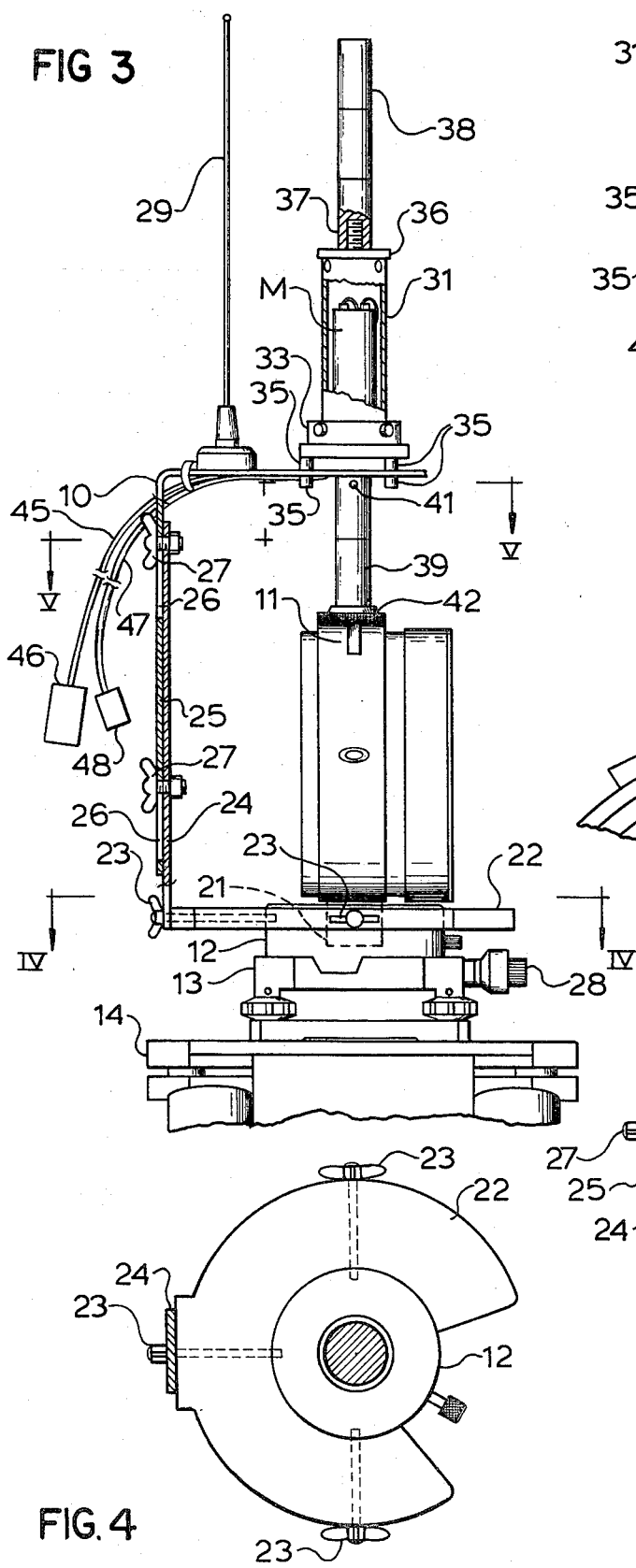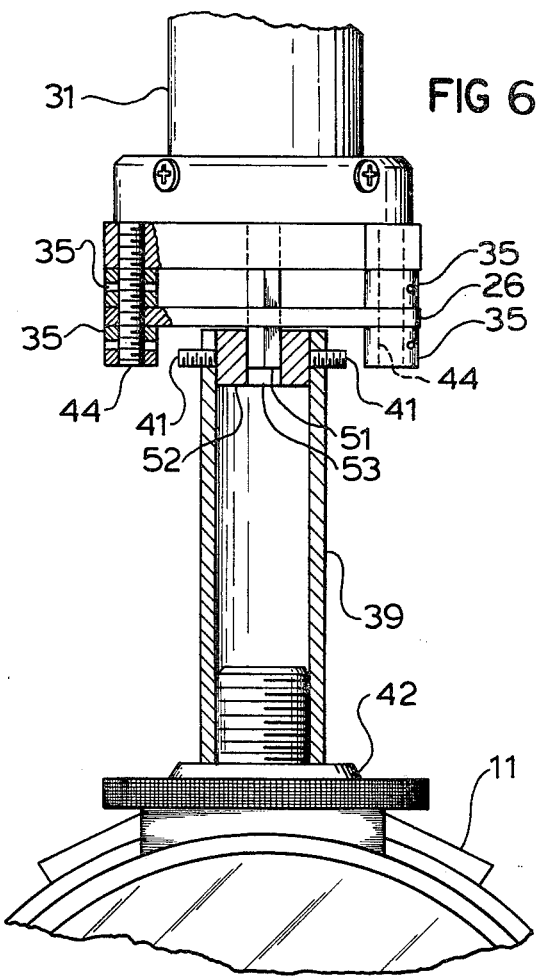

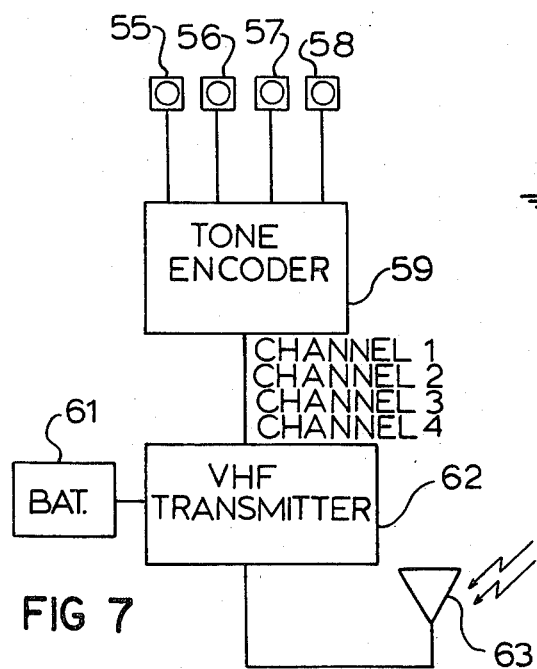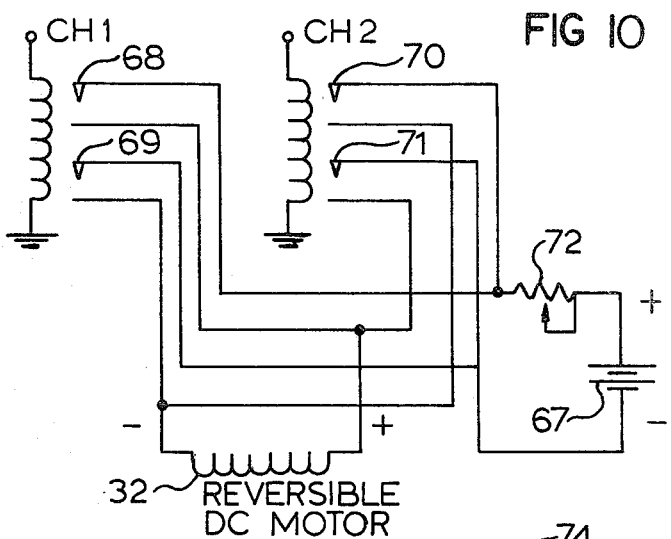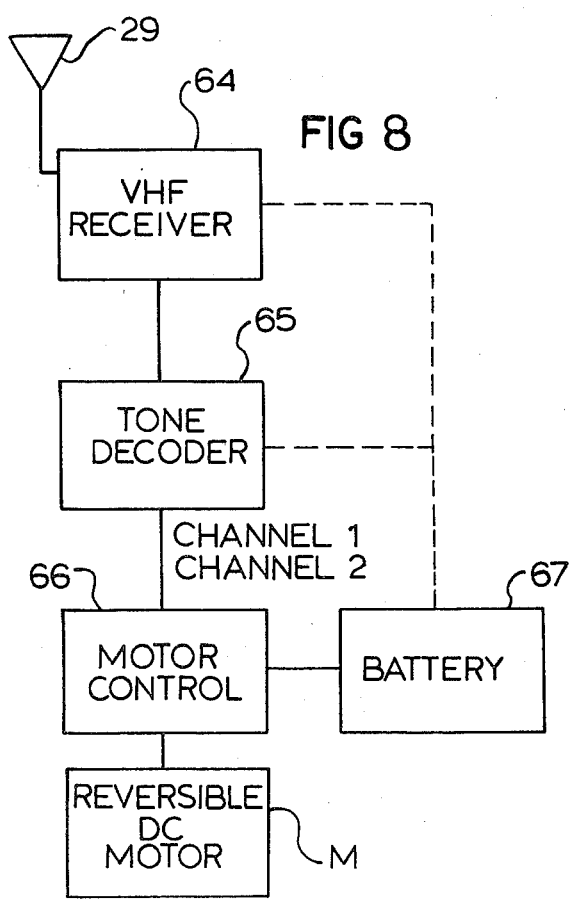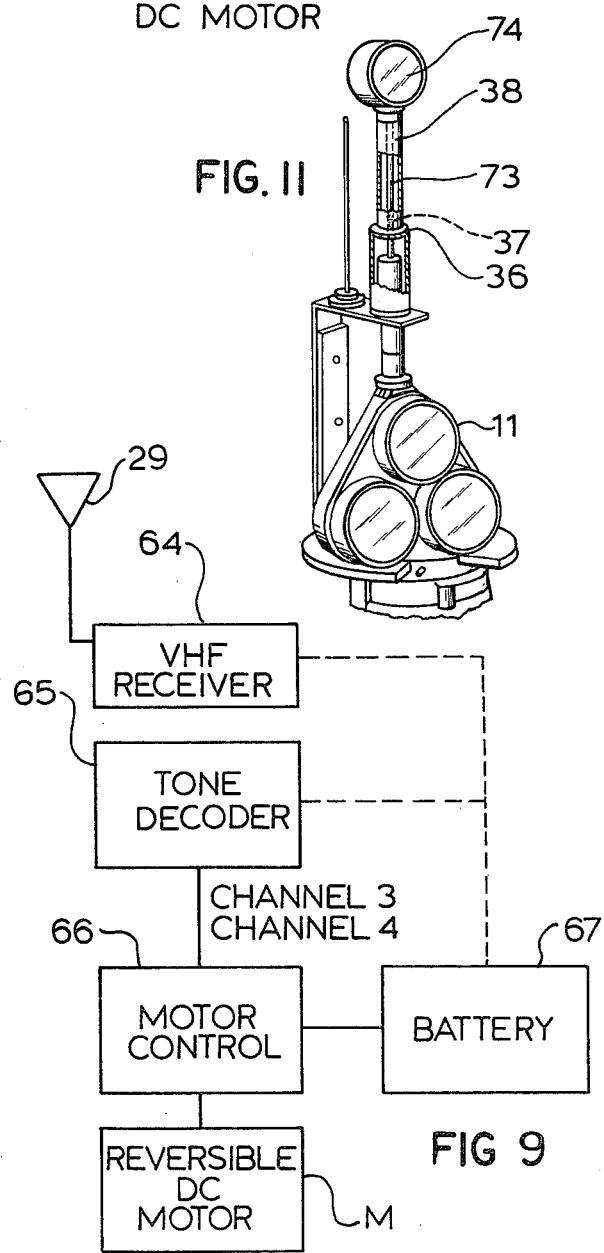

REMOTE CONTROL SURVEYING

FIELD OF THE INVENTION

This invention relates to the art of surveying and to a method and apparatus which eliminates the necessity for a rod man or other assistant when locating survey stations. More particularly, this invention relates to the use of remotely controlled electric motors to rotate reflectors into alignment with an electronic distance measuring device (hereinafter referred to as an "EDM").

PRIOR ART

A fundamental surveying operation is the locating of survey stations with reference to other stations or with reference to a standardized or assumed system of plane coordinates. This has been accomplished by direct measurement, triangulation and trilateration. With the advent and refinement of electronic distance measuring devices trilateration has become a preferred method. Heretofore, field survey techniques have required the employment of an assistant or time-consuming travel by the EDM operator to rotate the reflectors into alignment with successive locations of the EDM. This invention now provides a surveying system which can be efficiently operated by one person.

SUMMARY OF THE INVENTION

According to the invention, a plurality of rotatable reflectors are positioned at spaced base points to set up a base line of known length. A remote control survey station is selected at a convenient location viewable from the reflectors. The reflectors are then rotated by remote control from the survey station to reflect directly back to the control station. This establishes a triangle the sides of which can be measured preferably by electronic distance measuring devices and the angles of which can be easily calculated. The location of the survey station with reference to the base points or to a coordinate system is thus determined and from this location the direction and distance to any desired point may easily be found.

This invention may also be used to determine the distances from a plurality of survey stations to a single base point by locating a single reflector at the base point and by successively rotating the reflector by remote control to point the reflector directly at the successive survey stations. By turning horizontal angles to the reflector base point from each successive survey station, a traverse can be computed and closed.

According to a preferred embodiment of this invention, a walkie-talkie type hand-held radio transmitter is equipped with a multi-channel tone encoder. The operator selectively activates the channel corresponding to the desired reflector and direction of rotation. The encoded radio signal thus transmitted is received by the apparatus associated with the desired reflector where the signal is decoded and a reversible electric motor is energized to rotate the reflector in the desired direction. Rotation of the reflector continues until the operator selectively deactivates the encoded radio signal at the time the reflector is directed at the survey station and the EDM indicates maximum return of the reflected signal.

According to one embodiment of this invention, a structure is removably attached to a standard tribrach adapter to support a reversible electric motor vertically above a commercially available reflector assembly such that, when the tribrach is properly levelled and centered, the rotational axis of the motor is coincident with the plumb line which extends through the base point. A motor drive link is provided to transmit rotational force from the motor shaft to the reflector assembly. The supporting assembly is vertically adjustable to allow installation and removal of reflector assemblies and to accommodate reflector assemblies of various dimensions.

According to a second embodiment of this invention, a reversible electric motor is mounted directly on a standard tribrach adapter by means of a motor housing and tribrach adapter bushing. A commercially available reflector is secured vertically above the motor to a rotatable motor housing cap and rotational force is transmitted by a drive link.

It is then an object of this invention to provide an apparatus and method for surveying which eliminates the need for surveyor's assistants and surveyor-assistant communications in connection with electronic distance measuring operations.

Another object of this invention is to provide an apparatus and method for surveying which enables one surveyor to take electronic distance measurements without travel to reflector locations between relocations of an electronic distance measuring device.

A particular object of this invention is to provide an apparatus for rotating electronic distance measurement reflectors by remote control.

A further object of this invention is to provide a remotely controlled reflector rotating apparatus which accommodates commercially available reflectors of varying dimensions.

Another object of this invention is to provide a remotely controlled surveying reflector rotating device that will not interfere with the normal function of optical plummets or plumb lines.

Other and further objects of this invention will become apparent to those skilled in this art from the following detailed description of the annexed sheets of drawings which, by way of preferred examples only, illustrate two embodiments of the invention.

ON THE DRAWINGS

FIG. 3 is a fragmentary elevational view, with parts in vertical section, of an embodiment of the drive assembly of this invention.

FIG. 4 is a transverse sectional view taken along the line IV—IV of FIG. 3.

FIG. 5 is a transverse sectional view taken along the line V—V of FIG. 3.

FIG. 6 is a fragmentary elevational view, with parts in vertical section, showing the details of the motor and reflector connections.

FIG. 7 is a schematic diagram of a radio transmitter used in this invention.

FIG. 8 is a schematic diagram of the electrical system of the radio receiver and motor control corresponding to a first reflector rotating apparatus.

FIG. 9 is similar to FIG. 8 but corresponds to a second reflector rotating apparatus.

FIG. 10 is a schematic circuit diagram of the motor control.

FIG. 11 is a fragmentary perspective view, with parts in vertical section, of an embodiment of the drive assembly as used with a rotatable stroboscopic light.

AS SHOWN IN THE DRAWINGS

Figure 1:
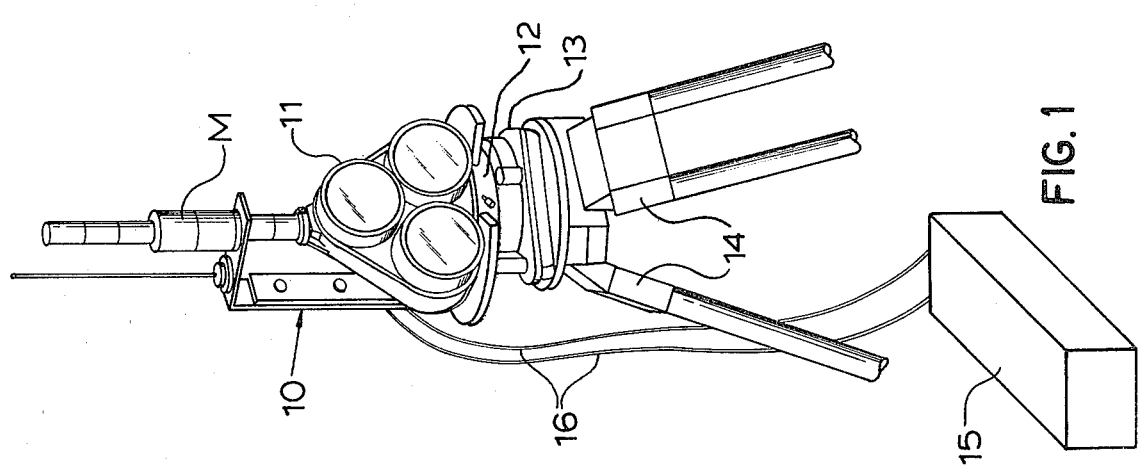
FIG. 1 is a side perspective view of a drive assembly of this invention as mounted on a tripod.

The reflector drive assembly 10 of one embodiment of this invention as shown in FIG. 1 is an attachment assembly including a standard reflector unit 11 easily mounted on a standard surveyor's tribrach adapter 12, tribrach 13 and tripod 14. A control box 15 connected to the drive assembly 10 by wires 16 contains a VHF radio receiver, a tone decoder, motor control and battery which energize a reversible direct current motor M thus rotating the reflector 11 in the desired direction. Rotation continues until an operator selectively deactivates a switch. Thus, by remote control, an operator may use the assembly to rotate the reflector 11 about a vertical axis to point in any horizontal direction.

Figure 2:
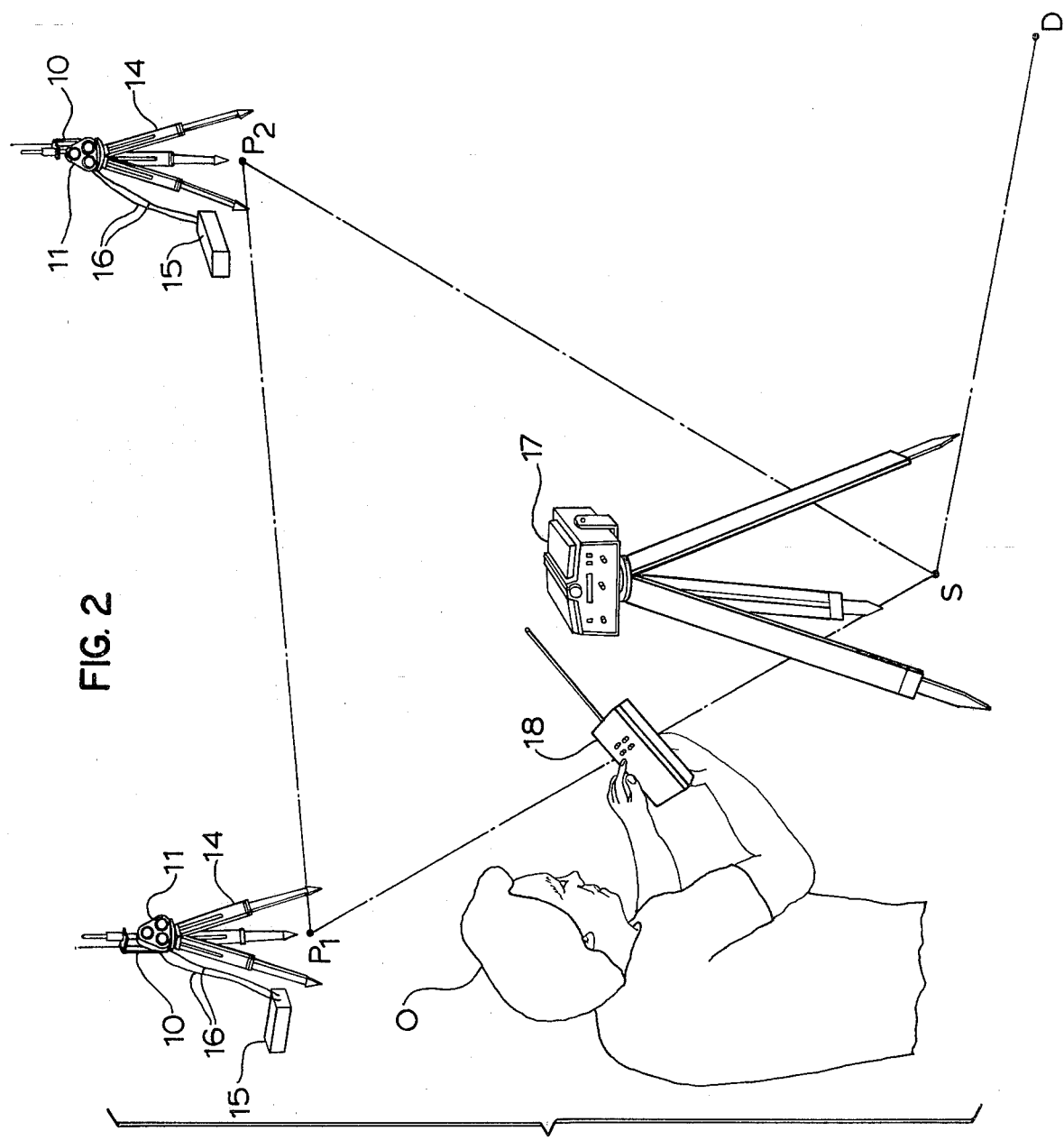
FIG. 2 is a perspective view of the apparatus of this invention as used in a typical trilateration operation with an electronic distance measuring device.

Referring to FIG. 2, the apparatus and method of this invention are illustrated as used in trilateration, a common surveying operation in which the lengths of the sides of a triangle are measured. First, a base line $P_1 P_2$ of known length is established. Directly over each base line end point, $P_1$ and $P_2$, a reflector 11 and drive assembly 10 is set up. A standard electronic distance measuring device 17 is then set up directly over a desired survey station S.

With the EDM directed at the reflector located over $P_1$ an operator O selectively activates a switch on a walkie-talkie type radio transmitter 18 corresponding to the desired reflector and direction of reflector rotation. A tone encoded radio signal is transmitted and received at the control box 15. By this means, the reflector is made to reflect directly back to the electronic distance measurement device.

The operator then makes a distance measurement thus establishing the length of line $P_1S$. Next, the electronic distance measuring device 17 is directed at the drive assembly 10 and reflector 11 located over base point $P_2$. As described above, this second reflector is rotated by remote control until it is pointing directly at the electronic measuring device. The length of line $P_2S$ is measured. Having established the lengths of the three sides of triangle $P_1P_2S$ the measures of the three interior angles may be determined by trigonometric calculation. If desired, the operator may measure the angle at point S as a check against the calculated value. If the coordinates of points $P_1$ and $P_2$ are known, the coordinates of point S may be calculated as may the direction and distance to a point D of desired coordinates. These computations are readily performed by an electronic programmable calculator.

After measurements have been taken at point S, the operator may desire to move the electronic distance measuring device to a new survey station. According to this invention the electronic distance measuring device may be moved to any point within the device's range on clear lines of sight with the reflectors without the need for travel to the reflectors to redirect them at the device. Nor is an assistant required. The operator uses the transmitter 18 and the drive assemblies 10 to rotate the reflectors into alignment with the new survey station. Taking the distance measurements to the reflectors $P_1$ and $P_2$ establishes the location of the new survey station with respect to $P_1$, $P_2$ and S. These operations may be continued at as many survey points as desired without physical human presence at $P_1$ or $P_2$.

As shown in FIG. 3, the drive assembly 10 is intended for use with a commercially available reflector 11, tribrach adapter bushing 21, tribrach adapter 12, tribrach 13 and tripod 14.

The drive assembly base plate 22 is removably attached to the tribrach adapter 12 by a plurality of mating bolts 23. The tribrach adapter 12 is drilled and tapped at points along its circumference corresponding to the mating bolts 23. Rigidly attached to the base plate 22 and extending upward therefrom is the lower arm 24. Movably attached to the lower arm 24 is the upper arm 25. A plurality of arm adjustment bolts 27 and slotted holes 26 permit the upper arm to be raised and lowered for installation or removal of the reflector 11 or to accommodate reflectors of various heights. A radio antenna 29 is mounted atop the upper arm 25.

Near the end of the upper arm 25 the reversible direct current motor M is enclosed in a cylindrical motor housing 31. The motor M and motor housing 31 are secured to a motor housing base 33 which, in turn, is adjustably secured to the upper arm 25 by means of a plurality of capstan screws and nuts 35. The upper end of the motor housing 31 is covered by a motor housing cap 36 which is surmounted by a threaded connector 37. Attached thereto is a sighting rod 38. Beneath the motor housing 31 and the upper arm 25 is a drive link 39. The upper end of the drive link 39 is removably attached to the motor shaft by means of set screws 41. The lower end of the drive link 39 is attahed to the reflector 11 by means of a threaded connector 42 which is generally supplied with the commercially available reflector 11.

Radio signals are conducted from the antenna 29 to the control box by an antenna wire 45 and an antenna wire connector 46. Electrical current from the control box 15 to the motor M is conducted by a motor wire 47 and motor wire connector 48.

In FIG. 3 it may be seen that all component parts of the drive assembly 10 are situated above the tribrach 13. Consequently, the apparatus does not interfere with the normal operation of an optical plummet 28 or plumb bob.

It is essential to the proper functioning of this invention that, when the tribrach is properly levelled and centered over the survey station, the rotational axes of the motor and drive link are coincident with the plumb line through the survey station.

As shown in FIG. 4 the base plate 22 is removably attached to the tribrach adapter 12 by spaced mating bolts 23. The mating bolts 23 extend through the collar into tapped holes in the tribrach adapter 12.

As shown in FIG. 5 the base plate 22 supports the lower arm 24 and upper arm at a distance from the rotational axis of the reflector 11. Counterclockwise rotation of the reflector is represented by movement from position A to B. It can be seen that with continued rotation there is no interference between the reflector 11 and the lower or upper arms 24 and 25.

As shown on FIGS. 3, 5 and 6, the drive link 39 transmits rotational force from the motor M to the reflector 11. The square motor shaft 51 extends below the motor housing base 33, through the upper arm 26 and into a square hole 53 in a plug 52 in the upper end of the drive link 39. Set screws 41 extend through the drive link 39 and plug 52 to removably secure the drive link 39 to the motor shaft 51.

As shown in FIG. 6 a plurality of capstan screws 44 and capstan nuts 35 are provided to allow adjustment of the rotational axis of the motor. By selectively loosening and tightening pairs of capstan nuts 35, the motor may be tilted and thereby brought into alignment with the vertical.

A schematic diagram of the electrical system for the walkie-talkie type radio transmitter 18 is illustrated in FIG. 7. Single pole single throw switches 55, 56, 57 and 58 individually correspond to the desired reflector and direction of rotation. When the operator selectively activates a switch, a tone encoder 59 is activated to generate an encoded signal in a corresponding channel. The relationship of the switches, reflectors, directions of rotation, and channels is as follows:

Switch 55—Reflector one clockwise—Channel 1;
Switch 56—Reflector one counterclockwise—Channel 2;
Switch 57—Reflector two clockwise—Channel 3;
Switch 58—Reflector two counterclockwise—Channel 4.

Power is supplied by a battery 61. The encoded signal is transmitted by a VHF transmitter 62 through an antenna 63.

A schematic diagram of the electrical system for one drive assembly 10 and control box 15 is illustrated in FIG. 8. The encoded radio signal transmitted by the walkie-talkie type radio transmitter 18 reaches the antenna 29 and is conducted to a VHF radio receiver 64. According to the transmitted channel, a tone decoder 65 sends a signal corresponding to the desired reflector and direction of rotation to a motor control 66. Power is supplied by a battery 67. The reversible direct current motor in the desired drive assembly is thus energized to rotate the reflector in the desired direction.

FIG. 9 is similar to FIG. 8 but illustrates the electrical system for a second drive assembly and control box.

A schematic diagram of the electrical system for the motor control 66 corresponding to one drive assembly is illustrated in FIG. 10. If the operator has activated switch 55 the tone decoder 65 will generate a signal over channel one thereby activating a relay having switches 68 and 69 and energizing the reversible DC motor M to rotate the reflector clockwise. If the operator has activated switch 56 the switches 70 and 71 will close, the polarity at the motor will be reversed and the reflector will rotate counterclockwise. A potentiometer 72 in series with the battery 67 allows for adjustment of the rotational speed.

As shown in FIG. 11, an elongated motor shaft 73 may be extended upward through the motor housing cap 36, threaded connector 37 and sighting rod 38 to a rotatably attached stroboscopic light 74. In this manner the stroboscopic light 74 may base made to rotate in conjunction with the reflector 11 thus aiding the operator in aligning the reflectors by providing a visually observable direction indicator. The strength of stroboscopic light beam will appear at its greatest when the reflector is directed at the operator.

Figure 12:
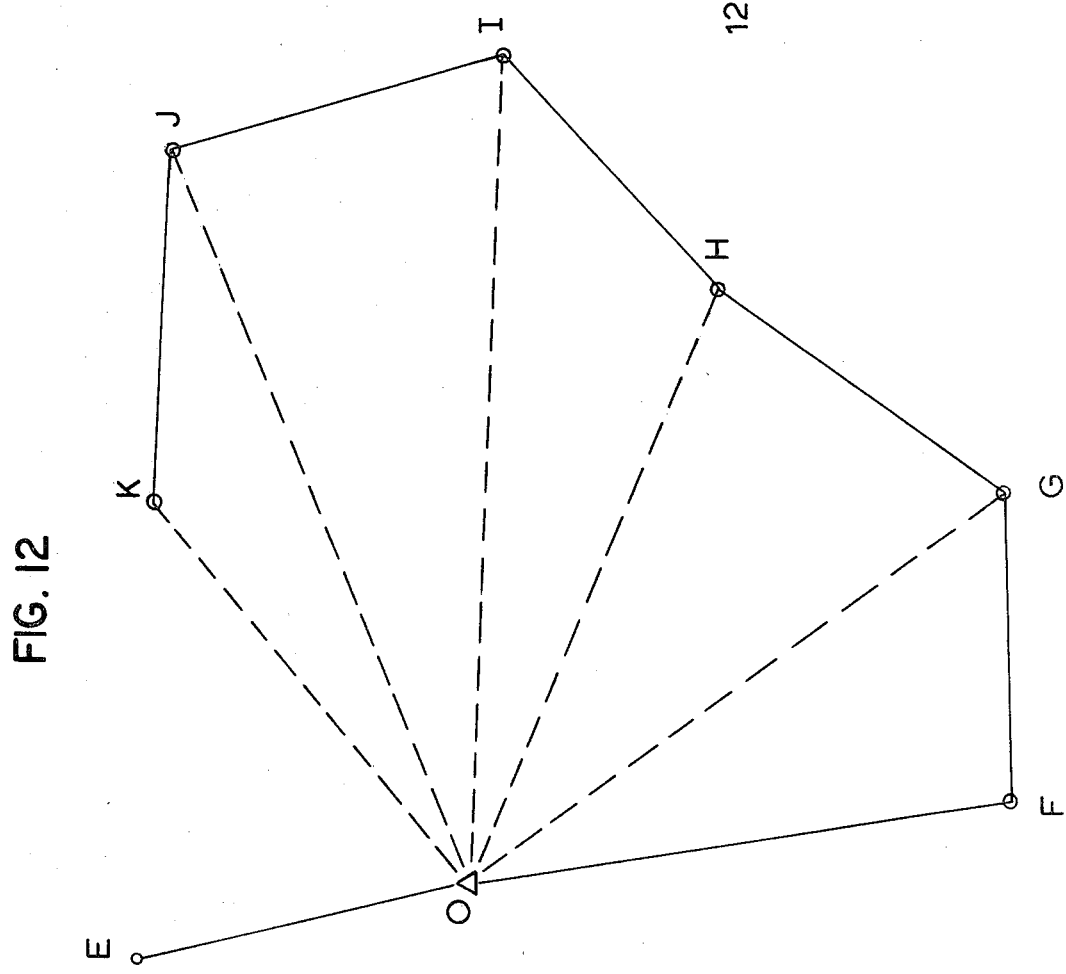
FIG. 12 is a diagrammatic plan view illustrating the use of this invention in a typical closed traverse operation.

Referring to FIG. 12, the use of the apparatus and method of this invention in a closed traverse is illustrated. A single reflector and drive assembly is set up directly over base point O. The operator advances from O to the survey station at point F, and sets up the EDM directly over point F and aims the EDM at the reflector and at the plumb line through point O. The operator then rotates the reflector to point directly at the EDM by means of the hand-held radio transmitter. Using the EDM, the operator measures the distance of line OF. Next, using a theodolite or other suitable instrument commonly used with an EDM, the operator turns angle OFG.

Next, the operator advances to the survey station at point G and sets the EDM up directly over point G. After pointing the theodolite at point F, the operator turns angle FGO. Then, with the EDM directed at the reflector over point O, the distance of line OG is measured. At this stage, the operator knows the length of two sides and the measures of two angles of triangle OFG. If the length of side FG is X, then by the law of sines, $$X = \frac{(\text{length of } OG) \cdot \sin[180 - (\angle OFG + \angle FGO)]}{\sin(\angle OFG)} \text{ or}$$

$$X = \frac{(\text{length of } OF) \cdot \sin[180 - (\angle OFG + \angle FGO)]}{\sin(\angle FGO)}.$$

Also, the measure of angle FOG may be calculated using the mean of the two values for X and the measures of all three angles of triangle OFG may be adjusted for 180 degree closure.

Resuming the traverse, the operator turns angle OGH. This measurement is optional, but the redundancy allows for added accuracy of calculated values. Next, the operator advances to the survey station at point H and sets up the EDM directly over point H. Angle GHO is turned, the reflector is rotated and line OH is measured. The length of line GH is calculated, and the measures of the angles of triangle OGH are calculated and adjusted.

The traverse continues with the angles at each successive survey station turned, the reflector rotated and the rays measured until the traverse is completed at point K.

From the foregoing description, it can be seen that the traverse may be completed without human intervention at the reflector. Each survey station may be selected at random so long as it is on a line of sight with the reflector. Each traverse leg may be verified and the overall accuracy of the traverse is enhanced by the ability to easily measure the distance from each survey station to the base point. Although use of an assistant may be desirable to flag or otherwise monument the survey stations, the amount of manpower and travel time is nevertheless decreased and the efficiency increased. If the bearing or azimuth of a reference line EO is known, the bearing of each traverse leg may be calculated. If, in addition, the coordinates of point O are known, the coordinates of each survey station along the traverse may be calculated.

Figure 13:
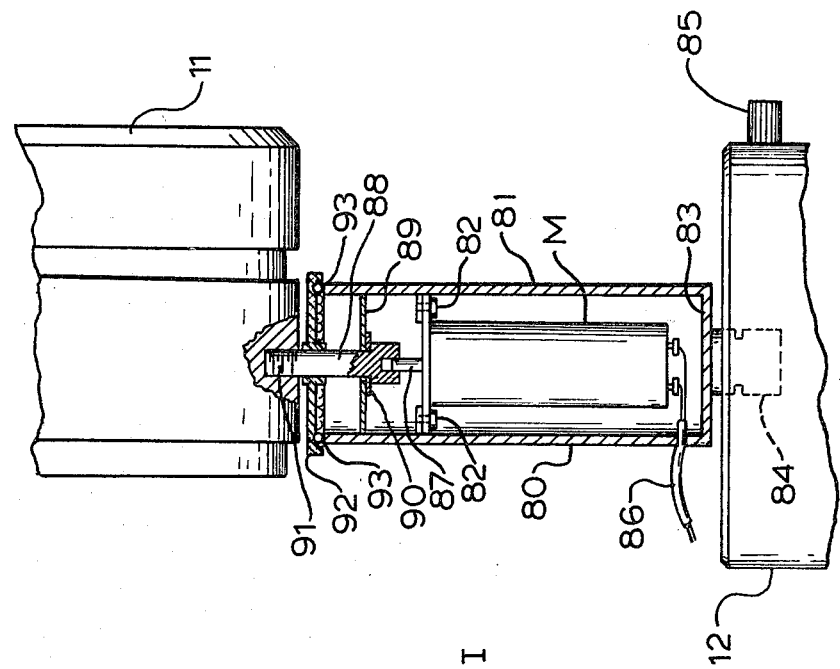
FIG. 13 is a fragmentary elevational view, with parts in vertical section, of a second embodiment of the drive assembly of this invention.

Referring to FIG. 13, a second embodiment of the drive assembly 80 of this invention is shown. The drive assembly 80 of this embodiment is intended for use with a commercially available reflector 11, tribrach adapter 12, tribrach and tripod.

A reversible electric motor M is mounted in the motor housing 81 by means of a plurality of screws 82 or other such means. The bottom of the motor housing 81 is covered by the motor housing base 83. Rigidly secured to the bottom of the motor housing base 83 is the tribrach adapter bushing 84. The tribrach adapter bushing 84 is inserted into the tribrach adapter 12 and the tribrach adapter locking screw 85 is tightened to prevent rotation of the motor housing 81 during operation. Wires 86 conduct electricity between the motor M and the control box 15 as shown in FIG. 1. The antenna 29 as shown in FIG. 3 may be clamped to the tripod 14.

Referring again to FIG. 13, extending vertically upward through the center of the motor M and the motor housing 81 is the motor shaft 87. The upper end of the motor shaft 87 may be squared or splined and mates with a hole in the bottom of the drive link 88. A fixed bulkhead 89 within the motor housing 81 and a snap ring 90 prevent the drive link 88 from being lifted upwardly out of the motor housing 81.

At the top of the drive link 88 is a threaded connector 91. Below the threaded connector 91 and rigidly fastened to the drive link 88 is the motor housing cap 97. The reflector 11 is mounted atop the motor housing cap 92 by means of the threaded connector 91 and a sighting rod may be mounted atop the reflector 11.

According to this embodiment of the invention, the weight of the reflector 11 is borne by the motor housing cap 92 and is transmitted through the motor housing 81, motor housing base 83 and tribrach adapter bushing 84 to the tribrach adapter 12. The weight is not borne by the motor M or motor shaft 87. To permit free rotation of the reflector 11 and motor housing cap 92 it is desirable to provide a ball bearing 93 or other low friction bearing surface along the sliding surfaces.

From the foregoing description, it may be seen that this embodiment provides a compact assembly with full 360 degree visibility. The reflector 11 may be elevated by the insertion of a section of sighting rod between the reflector 11 and the motor housing cap 91. In a manner similar to that shown in FIG. 11, a stroboscopic light 74 may be mounted atop the reflector 11 or sighting rod 38. However, no elongated motor shaft is required.

I claim as my invention:

1. The method of surveying which comprises selecting a pair of spaced base points, determining the distance between said base points, positioning remote control rotatable reflector units over said base points, said reflector units each having a stroboscopic light co-rotatable and co-directional therewith, establishing an electronic distance measurement survey station visible to said base points and spaced therefrom, selectively rotating said reflector units from said survey station, observing the brightness of each of said stroboscopic lights, ceasing rotating said reflector units when the observed brightness of each of said stroboscopic lights is at a maximum, determining the distances between each base point and the survey station, and calculating the location of the survey station relative to said base points.

2. The method of claim 1, including the added steps of relocating the electronic distance measuring device from the survey station to a second survey station spaced therefrom, repeating said selective rotations of the reflector units and brightness observations, said determination of distances and calculations, and calculating the location of the second survey station with respect to the base points.

3. The method of claim 2 including the added step of calculating the location of the second survey station with respect to the first survey station.

4. The method of surveying which comprises selecting a pair of spaced base points of known or assumed coordinates, positioning remotely controllable rotatable reflector units over said base points, said reflector units each having a stroboscopic light co-rotatable and co-directional therewith, positioning an electronic distance measuring device over a desired survey station visible to said base points and spaced therefrom, selectively rotating said reflector units from said survey station with a portable radio transmitter at the survey station, observing the brightness of each of said stroboscopic lights, ceasing rotating said reflector units when the observed brightness of each of said stroboscopic lights is at a maximum, determing the distances between each base point and the survey station with said electronic distance measuring device, and calculating the coordinates and bearings of the survey station with respect to the base points.

5. The method of surveying which comprises selecting a base point, positioning a remote control rotatable reflector unit over said base point, said reflector unit having a co-rotatable and co-directional stroboscopic light, establishing an electronic distance measurement survey station visible to said base point and spaced therefrom, rotating said reflector unit from said survey station into alignment with the survey station by observing the brightness of said stroboscopic light, and determining the distance between the base point and the survey station with said 6. The method of claim 5, including the added steps of measuring the angle formed by the base point, the survey station and a second survey station spaced therefrom and visible to said base point, relocating the electronic distance measuring device from the survey station to said second survey station, measuring the angle formed by the survey station, the second station and the base point, rotating the reflector unit by remote control from the second survey station into alignment with the second survey station by observing the brightness of the stroboscopic light, and determining the distance between the base point and the second survey station with said electronic measuring device.

7. The method of claim 6 including the added step of calculating the distance between the survey station and the second survey station.

8. The method of claim 6 including the added step of calculating the measures of the angles of the triangle formed by the base point, the survey station and the second survey station.

9. The method of claim 6 including the added steps of calculating the location of the survey station with respect to the base point.

* * * * *